US009228724B2

(12) United States Patent
Wu

(10) Patent No.: US 9,228,724 B2
(45) Date of Patent: Jan. 5, 2016

(54) MODULAR LED LAMP STRUCTURE WITH REPLACEABLE MODULES

(71) Applicant: Ming-Yuan Wu, Taipei (TW)

(72) Inventor: Ming-Yuan Wu, Taipei (TW)

( * ) Notice: Subject to any disclaimer, the term of this patent is extended or adjusted under 35 U.S.C. 154(b) by 97 days.

(21) Appl. No.: 13/779,385

(22) Filed: Feb. 27, 2013

(65) Prior Publication Data

US 2014/0160772 A1 Jun. 12, 2014

(30) Foreign Application Priority Data

Dec. 10, 2012 (TW) .............................. 101146358 A

(51) Int. Cl.
| | |
|---|---|
| F21V 29/00 | (2006.01) |
| F21V 17/00 | (2006.01) |
| F21S 8/02 | (2006.01) |
| F21K 99/00 | (2010.01) |
| F21V 17/14 | (2006.01) |
| F21V 21/04 | (2006.01) |
| F21Y 101/02 | (2006.01) |

(52) U.S. Cl.
CPC ............... *F21V 17/002* (2013.01); *F21S 8/02* (2013.01); *F21S 8/026* (2013.01); *F21K 9/30* (2013.01); *F21V 17/14* (2013.01); *F21V 21/04* (2013.01); *F21Y 2101/02* (2013.01)

(58) Field of Classification Search
CPC ......... F21Y 2101/02; F21K 9/30; F21K 9/10; F21V 23/008; F21V 29/20; F21V 15/011; F21V 19/003; F21V 21/03; F21S 8/02; F21S 8/04; F21S 8/088
USPC ................. 362/373, 294, 580, 547, 218, 264, 362/543–545, 345
See application file for complete search history.

(56) References Cited

U.S. PATENT DOCUMENTS 6,367,949 B1 * 4/2002 Pederson ....................... 362/240

* cited by examiner

*Primary Examiner* — Stephen F Husar
*Assistant Examiner* — Danielle Allen

(57) ABSTRACT

A LED lamp structure includes a LED emitting module and a radiator module. The radiator module includes a holder with an elastic slice to connect electrically to a driver unit for supplying power. The driver unit may be disposed in the radiator module or within the LED emitting module. Therefore, the structure of the LED lamp is simplified. The modules can be replaced when they break down, without having to discard the whole set of LED lamp, thus eliminating the unnecessary waste, in achieving cost-effectiveness and environment protection.

7 Claims, 6 Drawing Sheets

MODULAR LED LAMP STRUCTURE WITH REPLACEABLE MODULES

BACKGROUND OF THE INVENTION

1. Field of Invention

The present invention relates to a LED lamp, in particular to a LED lamp structure used for the purpose of illumination with replaceable modules.

2. Related Art

As a solid state light source, LEDs (light-emitting diodes) are a product with long life span, firm structure, low power consumption and flexible dimension such that they are becoming to take the place of conventional high pressure halide lamps in a wide range of lighting applications. However, LEDs would generate comparatively high heat energy, with a result of their high light fades and shortened life span. This leads to limited applications of LEDs to some extent.

A currently available LED lamp, which is used for the purpose of illumination, usually comprises a plurality of LED light sources to form a LED array in order to reach the required illuminance and power, because a single one LED light source has relatively low illuminance and power. The LED array structure may satisfy the requirement for illuminance, but it causes several problems including heat concentration, and high temperature at local positions. Because of the absence of specialized means for heat conduction and heat dissipation, the heat energy generated by the plurality of LED light sources cannot be effectively dissipated, such that the temperature of the housing of the lamp is so high to the extent that people would get scalded and that this lamp is vulnerable to get burned out.

Therefore, the LED lamp usually has a heatsink to dissipate the heat. This causes the structure of the LED lamp to be more complex. Also, the LED module, the heatsink and the driver circuit of the LED lamp have to be replaced all together and matched again correspondingly. Therefore, the conventional LED lighting device lacks the flexibility of assembling and is not economical. Furthermore, when parts of the LED lamp is in failure and needs replacement, it can not replace the failure part only and has to replace the entire LED lamp. In other words, the other non-failure parts are also replaced as well as the failure parts at the same time, which is in causing unnecessary waste.

SUMMARY OF THE INVENTION

The present invention overcomes the above-described and other problems and disadvantages in the prior art by providing a LED lamp with simplified structure to mass-produce easily with cost down and to enable rapid repair and maintenance.

A major objective of the present invention is to provide a modular LED lamp, wherein, the modules, such as a light emitting module, a radiator module, or a driver unit, can be replaced when they break down, without having to discard the whole set of LED lamp, thus eliminating the unnecessary waste, in achieving cost-effectiveness and environment protection.

Accordingly, the present invention provides a LED lamp including a radiator module, and a light emitting module. The radiator module includes a dissipating base, a holder and a driver unit. The driver unit is electrically connected to the holder. A body of the light emitting module includes at least one fixing pillar to electrically and physically connect to the holder of the radiator module. Therefore, the rapid repair and maintenance is permitted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
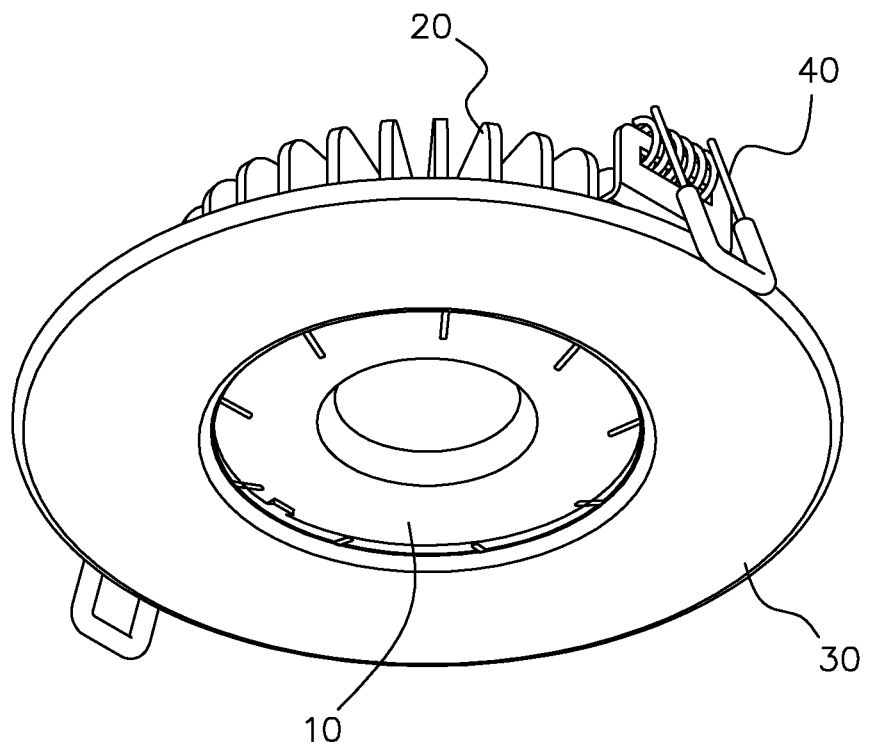
FIG. 1 is a perspective view of a lamp structure of the present invention.

A LED lamp structure used for the purpose of illumination according to the present invention is shown in FIG. 1. The LED lamp structure includes a light emitting module 10, a radiator module 20, a supporting ring 30, and an elastic fastener 40. As shown in FIG. 1, the LED lamp is a recessed light. The supporting ring 30 has the to fix the elastic fastener 40, see FIG. 2B. The supporting ring 30 and the elastic fastener 40 are configured to be embedded in a floor, wall or ceiling.

Figure 2A:
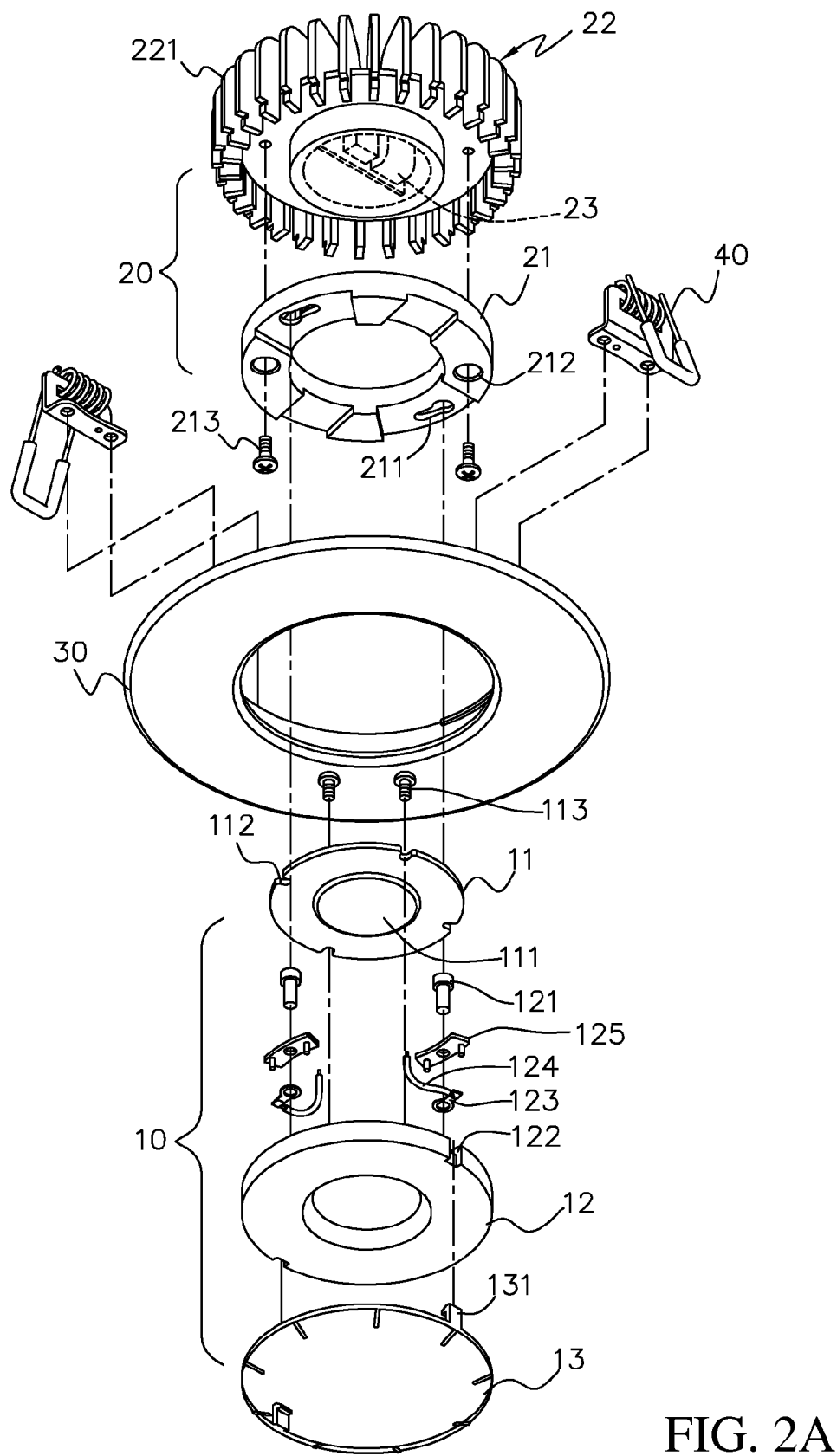
FIGS. 2A and 2B are exploded perspective views of the LED lamp of FIG. 1.
Figure 2B:
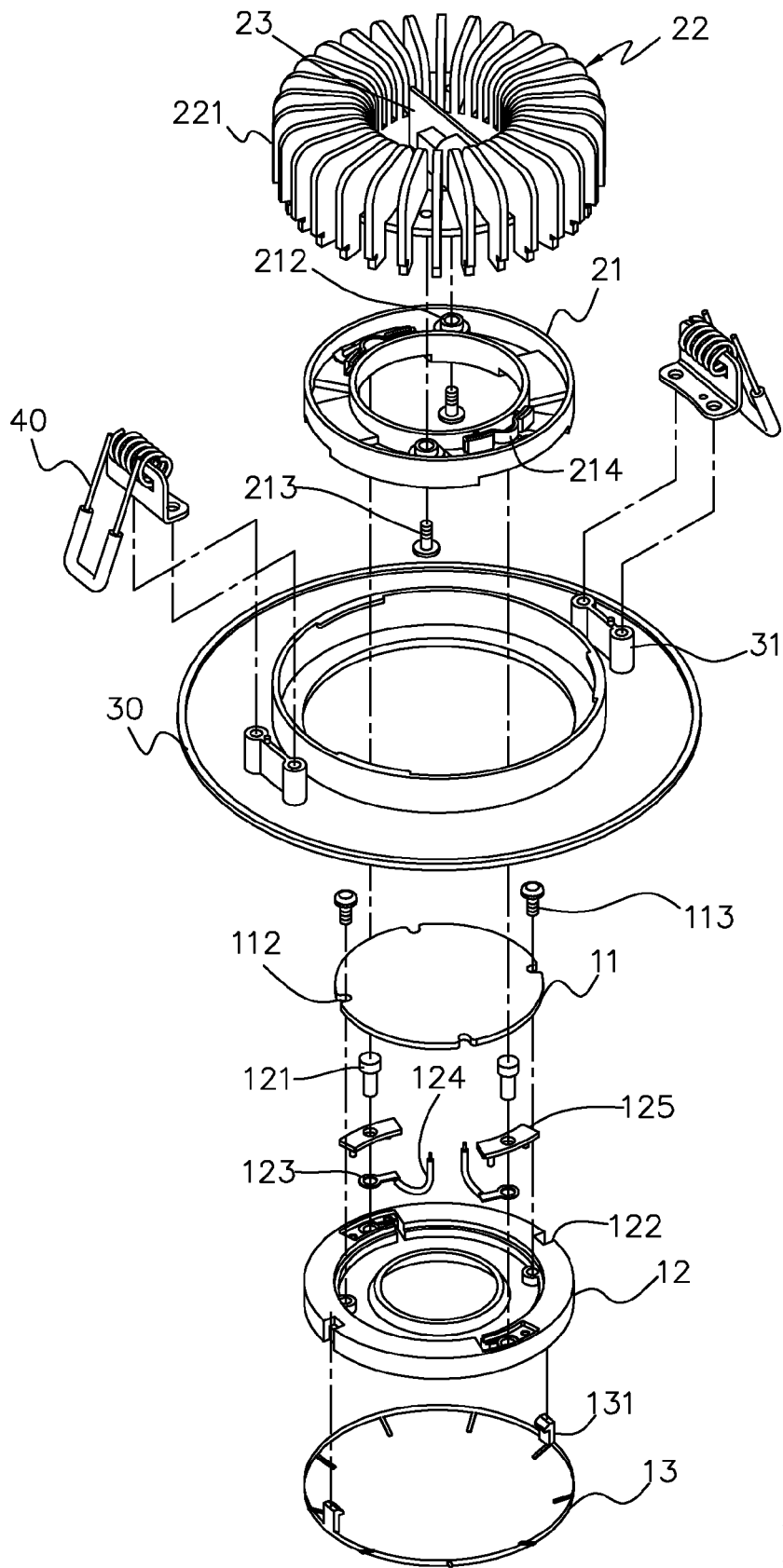

Please refer to FIGS. 2A-2B, the light emitting module 10 includes a substrate 11, a body 12 and a lamp cover 13. The substrate 11 is supported by the body 12. A plurality of LEDs 111 are disposed on the substrate 11 and configured to emit lights. The LEDs 111 may be a surface mounting device (SMD) or have a chip on board (COB) package structure. The lamp cover 13 is disposed on the body 12 and covers the substrate 11 to protect the LEDs 111. The lamp cover 13 can be made of glass, a polymer, or any other transparent or translucent material permitting light from the LEDs 111 to reach surrounding areas. The lamp cover 13 may also include decorative patterns, ribs reinforcing the strength thereof, prism shapes to diffuse light, color filters to control emitted light, or other properties or structures known for light covers in the art. The lamp cover 13 has at least one clip 131 and the body 12 includes a notch 122 at the periphery to assemble. Therefore, the lamp cover 13 is fixed to the body 12. Moreover, the light emitting module 10 may include a driver circuit.

The radiator module 20 includes a holder 21, a dissipating base 22, and a driver unit 23. The dissipating base 22 has a plurality of fins 221 thereon and is mounted on the holder 21. The driver unit 23 is electrically connected to the holder 21 and disposed in the dissipating base 22. The driver unit 23 is configured to receive input power from an AC power source such as a commercial power source or from a DC power source such as a battery, to convert the input power into required DC power, and output the required DC power to the LEDs 111. The light emitting module 10 is disposed on the radiator module 20 and connected to the holder 21 for electrically connection to the driver unit 23. The radiator module 20 is configured to dissipate the generated heat by the light emitting module 10. Moreover, the light emitting module 10 may include the driver unit 23.

Figure 3:
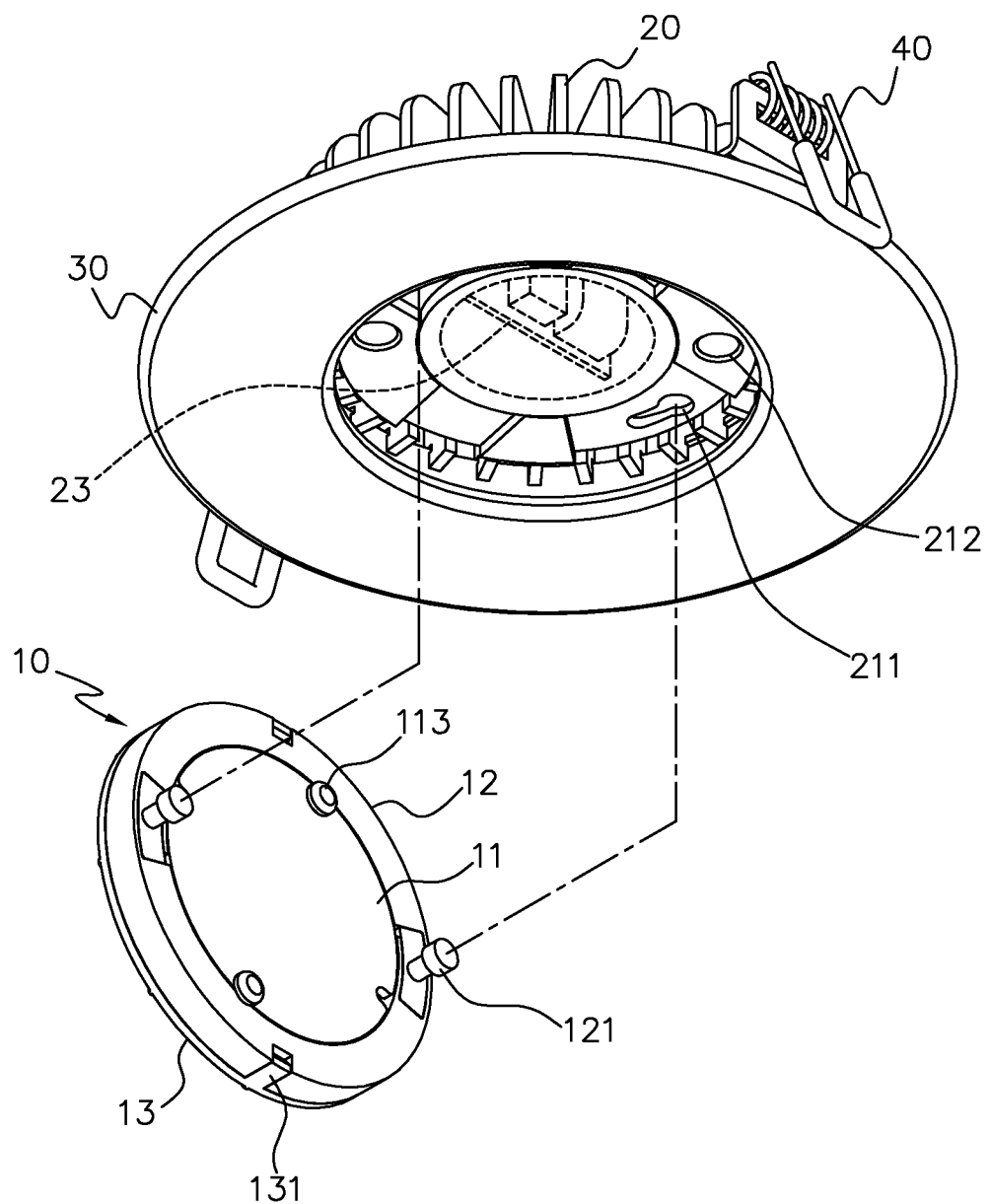
FIG. 3 is a partial exploded view of the LED lamp of FIG. 1.

The holder 21 further includes at lease one fixing hole 212. The screw 213 is utilized to fix the holder 21 to the dissipating base 22, please also see FIG. 3. The screw 113 is also utilized to fix the light emitting module 10 to the body 12. Therefore, the LED lamp structure is composed of the light emitting module 10 and the radiator module 20, which are changeable, removable and replaceable.

Please refer to FIGS. 2A-2B, the body 12 of the light emitting module 10 further includes at least one fixing pillar 121 to electrically and physically connect to the holder 21 of the radiator module 20. A fixing plate 125 is used to fix the fixing pillar 121 to the body 12, and the fixing pillar 121 is electrically connected to the LEDs 111 by at least one electrical lead 124.

Figure 4:
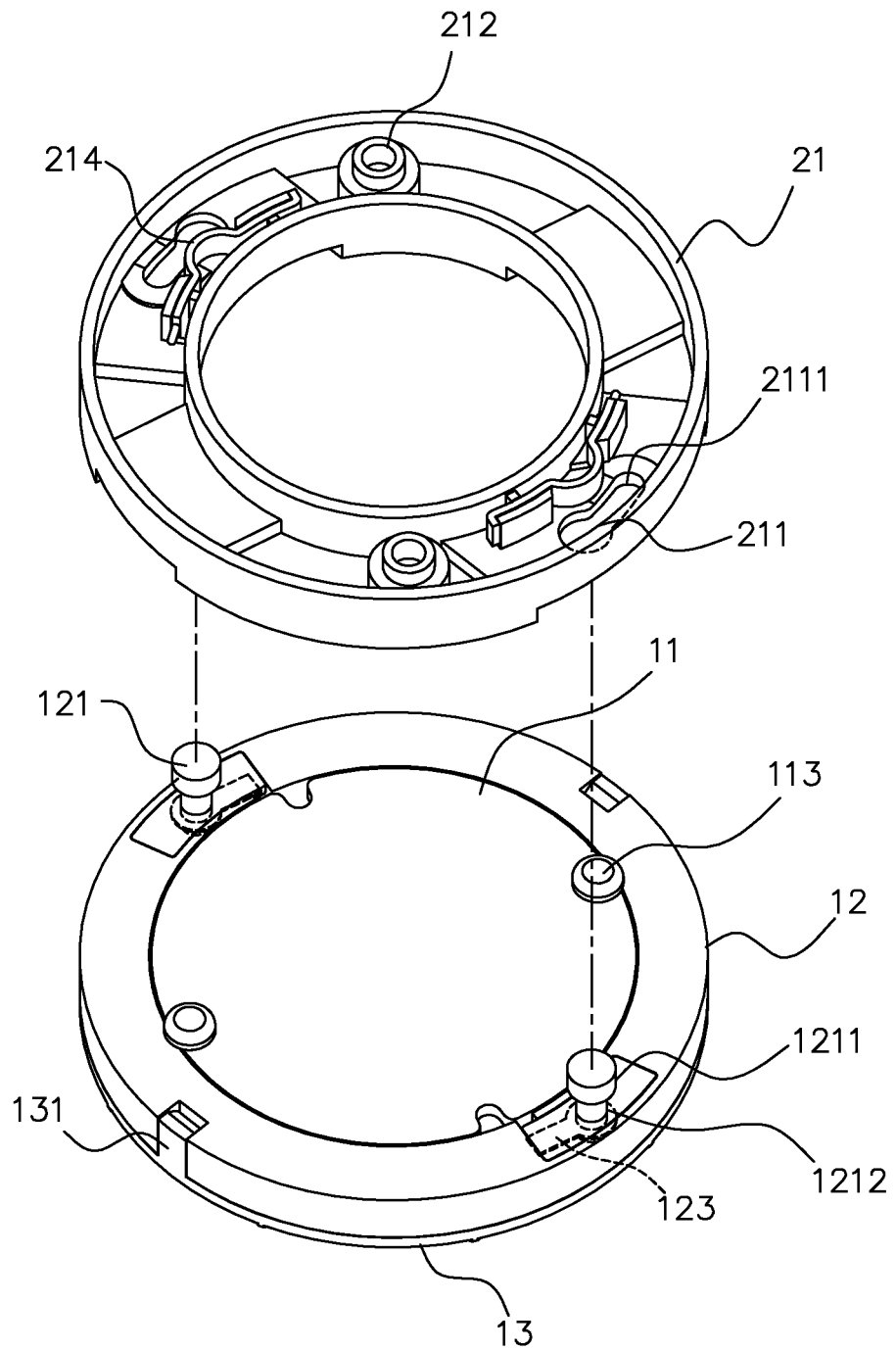
FIG. 4 is a schematic view of a body and a holder of the LED lamp of a preferred embodiment of FIG. 1.
Figure 5A:
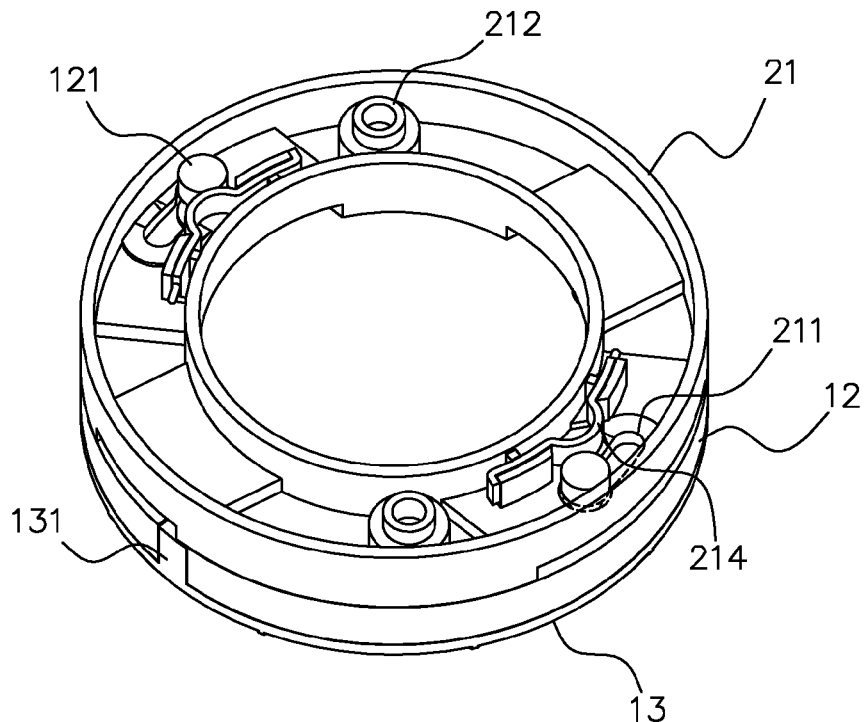
FIGS. 5A and 5B are assembly schematic views of the LED lamp of FIG. 4.
Figure 5B:
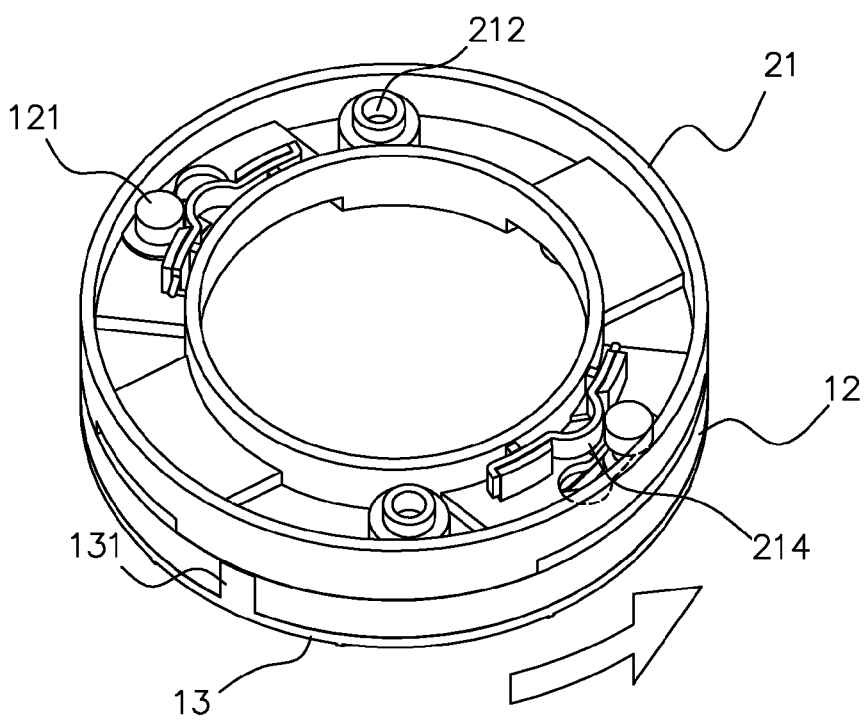

Please refer to FIGS. 4 and 5A-5B, the holder 21 of the radiator module 20 includes a slot 211 and a clamping edge 2111 extended from the slot 211, and the fixing pillar 121 includes a neck section 1212 and a connected head section 1211 with an outer diameter of the head section 1211 greater than a diameter of the neck section 1212. A diameter of the slot 211 is greater than a width of the clamping edge 2111 and the diameter of the slot 211 is large enough for the head section 1211 of the fixing pillar 121 to go through. The clamping edge 2111 has a second internal diameter which is too small to allow the head section 1211 of the fixing pillar 121 to go through. So that the fixing pillar 121 is inserted into the holder 21 through the slot 211 and slid to the clamping edge 2111 for holding the neck section 1212 by rotating the body 12. The holder 21 includes an elastic slice 214 connected to the driver unit 23 and disposed adjacent to the slot 211. When the neck section 1212 of the fixing pillar 121 is held by the clamping edge 2111, the fixing pillar 121 is connected electrically to the driver unit 23 through the elastic slice 214.

The modular design of the LED lamp eases maintenance and tends to lower costs of maintenance as a failed light emitting module, a radiator module, or a driver unit is easy to replace and is less expensive to replace than replacement of the entire lamp.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A LED lamp structure, comprising:
a radiator module, including:
a dissipating base, has a plurality of fins thereon;
a holder, mounted on the dissipating base; and
a driver unit, electrically connected to the holder; and
a light emitting module, disposed on the radiator module and connected to the holder for electrically connection to the driver unit; the light emitting module comprising:
a body;
a substrate, supported by the body and having a plurality of LEDs disposed thereon; and
a lamp cover, disposed on the body and covering the substrate to protect the LEDs
wherein the body of the light emitting module includes at least one fixing pillar to electrically and physically connect to the holder of the radiator module;
wherein the holder of the radiator module includes a slot and a clamping edge extended from the slot, and the fixing pillar includes a neck section and a connected head section with an outer diameter of the head section greater than a diameter of the neck section;
wherein a diameter of the slot being greater than a width of the clamping edge and the diameter of the slot being large enough for the head section of the fixing pillar to go through, and the clamping edge having a second internal diameter which is too small to allow the head section of the fixing pillar to go through, so that the fixing pillar is inserted into the holder through the slot and slid laterally to the clamping edge for holding the neck section.

2. The LED lamp structure of claim 1, wherein the driver unit is disposed in the dissipating base.

3. The LED lamp structure of claim 1, wherein the holder includes an elastic slice connected to the driver unit and disposed adjacent to the slot, when the neck section of the fixing pillar is held by the clamping edge, the fixing pillar is connected electrically to the driver unit through the elastic slice.

4. The LED lamp structure of claim 1, wherein the fixing pillar is electrically connected to the LEDs by at least one electrical lead.

5. The LED lamp structure of claim 1, wherein lamp cover includes a clip to fix on a notch of the body.

6. The LED lamp structure of claim 1, further comprising a supporting ring to support the radiator module.

7. The LED lamp structure of claim 6, wherein supporting ring includes an elastic fastener.

* * * * *